United States Patent
Drummond et al.

(10) Patent No.: US 11,302,080 B1
(45) Date of Patent: Apr. 12, 2022

(54) PLANNER FOR AN OBJECTIVE-EFFECTUATOR

(71) Applicant: Apple Inc., Cupertino, CA (US)

(72) Inventors: Mark Drummond, Palo Alto, CA (US); Siva Chandra Mouli Sivapurapu, Santa Clara, CA (US); Bo Morgan, Emerald Hills, CA (US)

(73) Assignee: APPLE INC., Cupertino, CA (US)

( * ) Notice: Subject to any disclaimer, the term of this patent is extended or adjusted under 35 U.S.C. 154(b) by 21 days.

(21) Appl. No.: 16/862,936

(22) Filed: Apr. 30, 2020

Related U.S. Application Data

(60) Provisional application No. 62/843,855, filed on May 6, 2019.

(51) Int. Cl.
| | |
|---|---|
| *G06T 19/00* | (2011.01) |
| *G06F 3/0484* | (2013.01) |
| *G06N 20/00* | (2019.01) |
| *G06F 3/0482* | (2013.01) |
| *G06N 3/08* | (2006.01) |
| *G06N 5/02* | (2006.01) |
| *G06F 3/04845* | (2022.01) |

(52) U.S. Cl.
CPC .......... *G06T 19/006* (2013.01); *G06F 3/0482* (2013.01); *G06F 3/04845* (2013.01); *G06N 3/08* (2013.01); *G06N 5/02* (2013.01); *G06N 20/00* (2019.01)

(58) Field of Classification Search
CPC . G06T 19/006; G06F 3/04845; G06F 3/0482; G06N 20/00; G06N 5/02; G06N 3/08
See application file for complete search history.

(56) References Cited

U.S. PATENT DOCUMENTS

| | | | |
|---|---|---|---|
| 10,503,964 B1 * | 12/2019 | Valgardsson | ..... G06F 16/24575 |
| 2003/0177187 A1 * | 9/2003 | Levine | .................... A63F 13/10 709/205 |
| 2018/0232204 A1 * | 8/2018 | Ghatage | .................. G06F 16/31 |
| 2018/0336415 A1 * | 11/2018 | Anorga | .................... G06F 16/50 |
| 2019/0321730 A1 * | 10/2019 | Shetty | ..................... A63F 13/69 |
| 2020/0306640 A1 * | 10/2020 | Kolen | .................... A63F 13/213 |
| 2020/0312003 A1 * | 10/2020 | Borovikov | ............. G06N 20/20 |

* cited by examiner

*Primary Examiner* — Grace Q Li
(74) *Attorney, Agent, or Firm* — Fernando & Partners, LLP

(57) ABSTRACT

In some implementations, a method includes obtaining an objective for a computer-generated reality (CGR) representation of an objective-effectuator. In some implementations, the objective is associated with a plurality of time frames. In some implementations, the method includes determining a plurality of candidate plans that satisfy the objective. In some implementations, the method includes selecting a first candidate plan of the plurality of candidate plans based on a selection criterion. In some implementations, the method includes effectuating the first candidate plan in order to satisfy the objective. In some implementations, the first candidate plan triggers the CGR representation of the objective-effectuator to perform a series of actions over the plurality of time frames associated with the objective.

25 Claims, 9 Drawing Sheets

PLANNER FOR AN OBJECTIVE-EFFECTUATOR

CROSS-REFERENCE TO RELATED APPLICATION

This application claims the benefit of U.S. Provisional Patent App. No. 62/843,855, filed on May 6, 2019, which is incorporated by reference in its entirety.

TECHNICAL FIELD

The present disclosure generally relates to a planner for an objective-effectuator.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
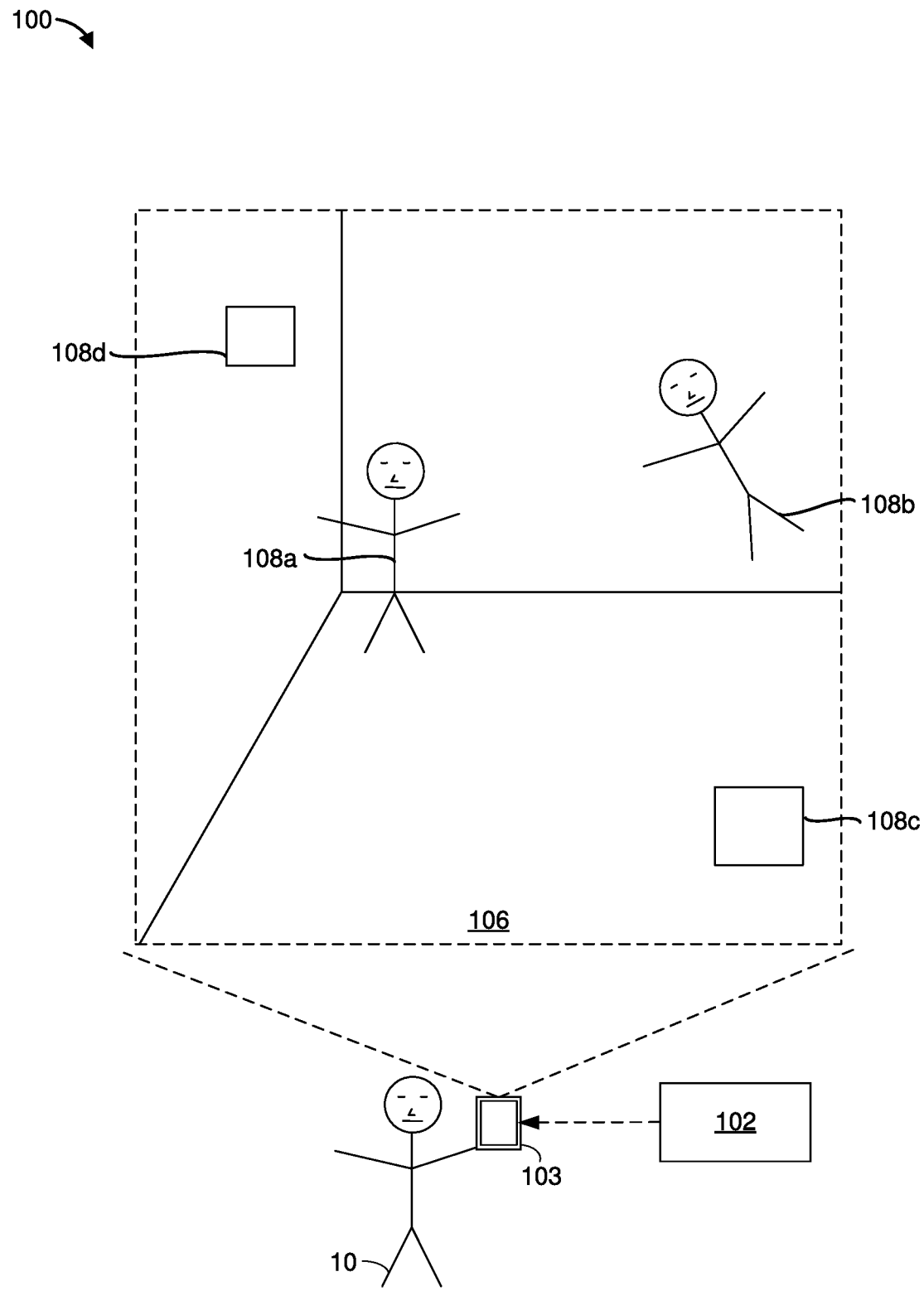
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining a plan to satisfy an objective of an objective-effectuator. In various implementations, a device includes a non-transitory memory and one or more processors coupled with the non-transitory memory. In some implementations, a method includes obtaining an objective for a computer-generated reality (CGR) representation of an objective-effectuator. In some implementations, the objective is associated with a plurality of time frames. In some implementations, the method includes determining a plurality of candidate plans that satisfy the objective. In some implementations, the method includes selecting a first candidate plan of the plurality of candidate plans based on a selection criterion. In some implementations, the method includes effectuating the first candidate plan in order to satisfy the objective. In some implementations, the first candidate plan triggers the CGR representation of the objective-effectuator to perform a series of actions over the plurality of time frames associated with the objective.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for generating a plan that satisfies an objective of an objective-effectuator. An objective-effectuator performs a set of one or more actions in order to effectuate an objective of the objective-effectuator. Some objectives span multiple time frames. For example, some objectives span several minutes, hours or days. A planner generates a plan for satisfying an objective that satisfies multiple time frames. The planner identifies various candidate plans that satisfy the objective. Each candidate plan is associated with a corresponding confidence score. The planner selects one of the candidate plans based on the respective confidence scores. The objective-effectuator effectuates the selected plan in order to satisfy the objective of the objective-effectuator. The selected plan triggers a computer-generated reality (CGR) representation of the objective-effectuator to perform a series of actions over the time frames associated with the objective. For example, if the objective spans twenty minutes, then the selected plan triggers the CGR representation of the objective-effectuator to perform various actions over the twenty minutes in order to satisfy the objective.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated reality (CGR) environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from the physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of objective-effectuators, such as a boy action figure representation 108a that represents a boy objective-effectuator, a girl action figure representation 108b that represents a girl objective-effectuator, a robot representation 108c that represents a robot objective-effectuator, and a drone representation 108d that represents a drone objective-effectuator. In some implementations, the objective-effectuators represent (e.g., model behavior of) characters from fictional materials, such as movies, video games, comics, and novels. For example, the boy action figure representation 108a represents (e.g., models behavior of) a 'boy action figure' character from a fictional comic, and the girl action figure representation 108b represents (e.g., models behavior of) a 'girl action figure' character from a fictional video game. In some implementations, the CGR environment 106 includes objective-effectuators that represent (e.g., model behavior of) respective characters from different fictional materials (e.g., from different movies/games/comics/novels). In various implementations, the objective-effectuators model behavior of physical entities (e.g., tangible objects). For example, in some implementations, the objective-effectuators represent equipment (e.g., machinery such as planes, tanks, robots, cars, etc.). In the example of FIG. 1, the robot representation 108c represents a robot object-effectuator that models the behavior of a robot, and the drone representation 108d represents a drone objective-effectuator that models the behavior of a drone. In some implementations, the objective-effectuators represent (e.g., model behavior of) fictional entities (e.g., characters, equipment, etc.) from fictional materials. In some implementations, the objective-effectuators represent (e.g., model behavior of) entities from a physical environment, including entities located inside and/or outside of the CGR environment 106. In various implementations, an objective-effectuator models the behavior of an entity by manipulating a CGR representation of the objective-effectuator in order to provide an appearance that the CGR representation of the objective-effectuator is performing a set of one or more actions that are within a similarity threshold of actions that the entity performs.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators perform. In some implementations, the actions of the objective-effectuators are within a degree of similarity to (e.g., within a similarity threshold of) actions that the corresponding entities (e.g., characters or objects) perform in the fictional material. In the example of FIG. 1, the girl action figure representation 108b is performing the action of flying (e.g., because the corresponding 'girl action figure' character is capable of flying, and/or the 'girl action figure' character frequently flies in the fictional materials). In the example of FIG. 1, the drone representation 108d is performing the action of hovering (e.g., because drones in physical environments are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, CGR representations of the objective-effectuators are referred to as CGR objects. In some implementations, an objective-effectuator representing (e.g., modeling the behavior of) a character is referred to as a character objective-effectuator. In some implementations, a character objective-effectuator performs actions to effectuate a character objective. In some implementations, an objective-effectuator representing (e.g., modeling the behavior of) an equipment is referred to as an equipment objective-effectuator. In some implementations, an equipment objective-effectuator performs actions to effectuate an equipment objective. In some implementations, an objective effectuator representing (e.g., modeling the behavior of) an environment is referred to as an environmental objective-effectuator. In some implementations, an environmental objective-effectuator performs environmental actions to effectuate an environmental objective.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 determine (e.g., generate) actions for the objective-effectuators based on a user input from the user 10. For example, in some implementations, the electronic device 103 receives a user input indicating placement of the CGR representations of the objective-effectuators. In such implementations, the controller 102 and/or the electronic device 103 position the CGR representations of the objective-effectuators in accordance with the placement indicated by the user input. In some implementations, the user input indicates specific actions that the objective-effectuators are permitted to perform. In such implementations, the controller 102 and/or the electronic device 103 select the actions for the objective-effectuators from the specific actions indicated by the user input. In some implementations, the controller 102 and/or the electronic device 103 forgo actions that are not among the specific actions indicated by the user input.

In various implementations, the controller 102 and/or the electronic device 103 generate a plan to satisfy an objective of an objective-effectuator. In some implementations, the plan triggers the CGR representation of the objective-effectuator to perform a series of actions over a set of time frames associated with the objective. In some implementations, the plan specifies types of actions for the CGR representation of the objective-effectuator to perform in order to advance (e.g., satisfy) the objective of the objective-effectuator. In some implementations, the plan includes specific actions for the CGR representation of the objective-effectuator to perform in order to advance the objective of the objective-effectuator.

In some implementations, the plan includes a timeline which orders the actions for the CGR representation of the objective-effectuator over the set of time frames associated with the objective. In some implementations, the plan distributes the actions for the CGR representation of the objective-effectuator across the set of time frames associated with the objective. For example, in some implementations, the plan distributes the actions across the set of time frames such that the actions are spread approximately evenly across the set of time frames. In some implementations, the plan includes performing at least one action during each of the time frame in the set of time frames.

In some implementations, the controller 102 and/or the electronic device 103 generate the plan for an objective-effectuator based on a plot template associated with the CGR environment 106. In some implementations, the plot template defines a type of plot for the CGR environment 106. Example plot templates include a mystery plot template, a disaster plot template, a comedy plot template and a rescue plot template. In some implementations, the plan triggers actions that are consistent with the plot template for the CGR environment 106. For example, if the plot template for the CGR environment 106 is a comedy plot template, then the plan for an objective-effectuator triggers actions that satisfy a comedic threshold.

In some implementations, the user 10 wears a head-mountable device (HMD). In various implementations, the HMD operates in substantially the same manner as the electronic device 103 shown in FIG. 1. In some implementations, the HMD performs substantially the same operations as the electronic device 103 shown in FIG. 1. For example, in some implementations, the HMD, being worn by the user 10, presents (e.g., displays) the CGR environment 106 according to various implementations. In some implementations, the HMD includes an integrated display (e.g., a built-in display) that displays the CGR environment 106. In some implementations, the HMD includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the CGR environment 106.

Figure 2:
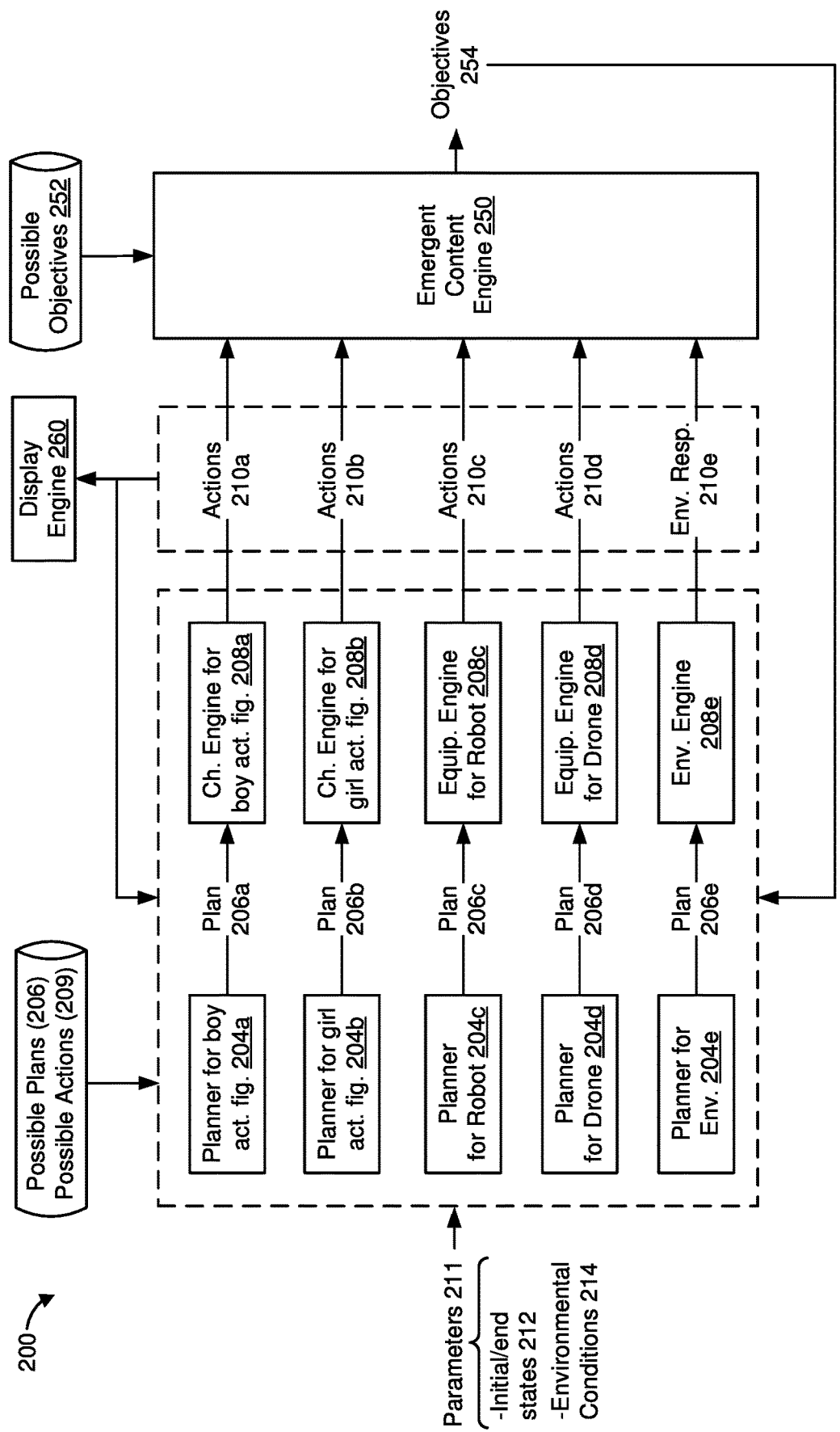
FIG. 2 is a block diagram of an example system in accordance with some implementations.

FIG. 2 is a block diagram of an example system 200 that generates plans for various objective-effectuators in a CGR environment. To that end, the system includes planners 204a . . . 204e, objective-effectuator engines, and an emergent content engine 250. In various implementations, the emergent content engine 250 provides objectives 254 for various objective-effectuators. The planners 204a . . . 204e generate plans 206a . . . 206e for the objective-effectuators based on the objectives 254. The planners 204a . . . 204e provide the plans 206a . . . 206e to the objective-effectuator engines. The objective-effectuator engines generate actions 210*a* . . . 210*e* based on the plans 206*a* . . . 206*e*. The actions 210*a* . . . 210*e* are performed by CGR representations of the objective-effectuators.

In various implementations, the planners 204*a* . . . 204*e* and objective-effectuator engines collectively generate the plans 206*a* . . . 206*e* and the actions 210*a* . . . 210*e*. In some implementations, the objective-effectuator engines generate the actions 210*a* . . . 210*e* in accordance with the plans 206*a* . . . 206*e*. In various implementations, the planners 204*a* . . . 204*e* generate the plans 206*a* . . . 206*e* based on the actions 210*a* . . . 210*e*. In some implementations, the planners 204*a* . . . 204*e* generate/adjust the plans 206*a* . . . 206*e* based on historical/future actions.

In some implementations, a planner generates a plan that triggers a CGR representation of a particular objective-effectuator to perform actions in accordance with the plan. In the example of FIGS. 1 and 2, the planner 204*a* generates the plan 206*a* which triggers the boy action figure representation 108*a* to perform the actions 210*a*. The planner 204*b* generates the plan 206*b* which triggers the girl action figure representation 108*b* to perform the actions 210*b*. The planner 204*c* generates the plan 206*c* which triggers the robot representation 108*c* to perform the actions 210*c*. The planner 204*d* generates the plan 206*d* which triggers the drone representation 108*d* to perform the actions 210*d*. The planner 204*e* generates the plan 206*e* which triggers an environment of the CGR environment 106 to perform the actions 210*e*.

In various implementations, the planners 204*a* . . . 204*e* select the plans 206*a* . . . 206*e* from a set of possible plans 206 stored in a datastore. In some implementations, the possible plans 206 are obtained from corresponding fictional source material. For example, in some implementations, the controller 102 and/or the electronic device 103 shown in FIG. 1 perform semantic analysis on actions performed in the fictional source material and determine (e.g., construct) the possible plans 206 based on the actions. In some implementations, the possible plans 206 vary for different objective-effectuators. For example, in some implementations, the possible plans 206 for the girl action figure representation 108*b* include planning a rescue operation and planning a fight, whereas the possible plans 206 for the boy action figure representation 108*a* include planning a comedy routine and planning a social gathering.

In some implementations, the planners 204*a* . . . 204*e* generate the plans 206*a* . . . 206*e* based on a set of possible actions 209 stored in a datastore. In some implementations, the set of possible actions 209 represent actions that the CGR representations of objective-effectuators are capable of performing in a CGR environment. For example, the set of possible actions 209 represent actions that the boy action figure representation 108*a*, the girl action figure representation 108*b*, the robot representation 108*c* and/or the drone representation 108*d* are capable of performing. In some implementations, the planners 204*a* . . . 204*e* generate the plans 206*a* . . . 206*e* such that the plans 206*a* . . . 206*e* can be satisfied (e.g., carried out) with the set of possible actions 209.

In the example of FIG. 2, the system 200 includes objective-effectuator engines that generate actions in accordance with corresponding plans. For example, a character engine 208*a* generates the actions 210*a* for the boy action figure representation 108*a* in accordance with the plan 206*a*. A character engine 208*b* generates the actions 210*b* for the girl action figure representation 108*b* in accordance with the plan 206*b*. An equipment engine 208*c* generates the actions 210*c* for the robot representation 108*c* (e.g., responses for the robot representation 108*c*) in accordance with the plan 206*c*. An equipment engine 208*d* generates the actions 210*d* for the drone representation 108*d* (e.g., responses for the drone representation 108*d*) in accordance with the plan 206*d*. An environmental engine 208*e* generates environmental responses 210*e* for an environment of the CGR environment 106 based on the plan 206*e*.

In various implementations, the planners 204*a* . . . 204*e* generate the plans 206*a* . . . 206*e* based on a set of parameters 211. In some implementations, the parameters 211 include a set of initialization conditions for a CGR environment. In some implementations, the parameters 211 are provided by an operator (e.g., a human operator, for example, a user of a device). In some implementations, the parameters 211 are generated by a CGR environment. In some implementations, the parameters 211 are provided by objective-effectuators that are instantiated in the CGR environment. In some implementations, the parameters 211 include initial/end states 212 for the CGR environment 106. In some implementations, the parameters 211 include environmental conditions 214 for the CGR environment 106.

In some implementations, the planners 204*a* . . . 204*e* generate the plans 206*a* . . . 206*e* based on the initial/end states 212 for the CGR environment 106. In some implementations, the CGR environment 106 is associated with a time duration (e.g., a few minutes, hours or days). For example, the CGR environment 106 is scheduled to last for the time duration associated with the CGR environment 106. In some implementations, the initial/end states 212 indicate initial/end placements of the characters/equipment at the beginning of the time duration and/or at the end of the time duration associated with the CGR environment 106. In such implementations, the plans 206*a* . . . 206*e* are a function of the initial/end placements of the characters/equipment at the beginning/end of the time duration associated with the CGR environment 106.

In some implementations, the planners 204*a* . . . 204*e* generate the plans 206*a* . . . 206*e* based on the environmental conditions 214 for the CGR environment 106. In some implementations, the environmental conditions 214 specify weather conditions within the CGR environment 106. For example, the environmental conditions 214 specify an amount of precipitation, an amount of snowfall and/or a visibility level in the CGR environment 106. In some implementations, the environmental conditions 214 are specified by the user. In some implementations, the planners 204*a* . . . 204*e* forgo plans that are adversely impacted by the environmental conditions 214 (e.g., by assigning a low confidence score to adversely-affected plans). For example, if the environmental conditions 214 indicate that it is raining in the CGR environment 106, then a plan to light a camp fire in the CGR environment 106 is assigned a low confidence score. In various implementations, the environmental conditions 214 limit the plans 206*a* . . . 206*e* generated by the planners 204*a* . . . 204*e*.

In some implementations, the emergent content engine 250 generates the objectives 254 based on a set of possible objectives 252 that are stored in a datastore. In some implementations, the possible objectives 252 are obtained from corresponding fictional source material. For example, in some implementations, the possible objectives 252 for the girl action figure representation 108*b* include saving lives, rescuing pets, and/or fighting crime. In some implementations, the planners 204*a* . . . 204*e* utilize the objectives 254 to generate additional plans and/or to modify previously-generated plans. For example, in some implementations, the planner 204*a* utilizes the objectives 254 to generate an additional plan 206a and/or modify a previously-generated plan 206a for the boy action figure representation 108a.

In various implementations, the character/equipment/environmental engines provide the actions 210a . . . 210e to a display engine 260 (e.g., a rendering and display pipeline). In some implementations, the display engine 260 modifies the CGR representations of the objective-effectuators and/or the environment of the CGR environment 106 based on the actions 210a . . . 210e. In various implementations, the display engine 260 modifies the CGR representations of the objective-effectuators such that the CGR representations of the objective-effectuator can be seen as performing the actions 210a . . . 210e. For example, if an action for the girl action figure representation 108b is to fly, the display engine 260 moves the girl action figure representation 108b within the CGR environment 106 in order to give the appearance that the girl action figure representation 108b is flying within the CGR environment 106.

Figure 3A:
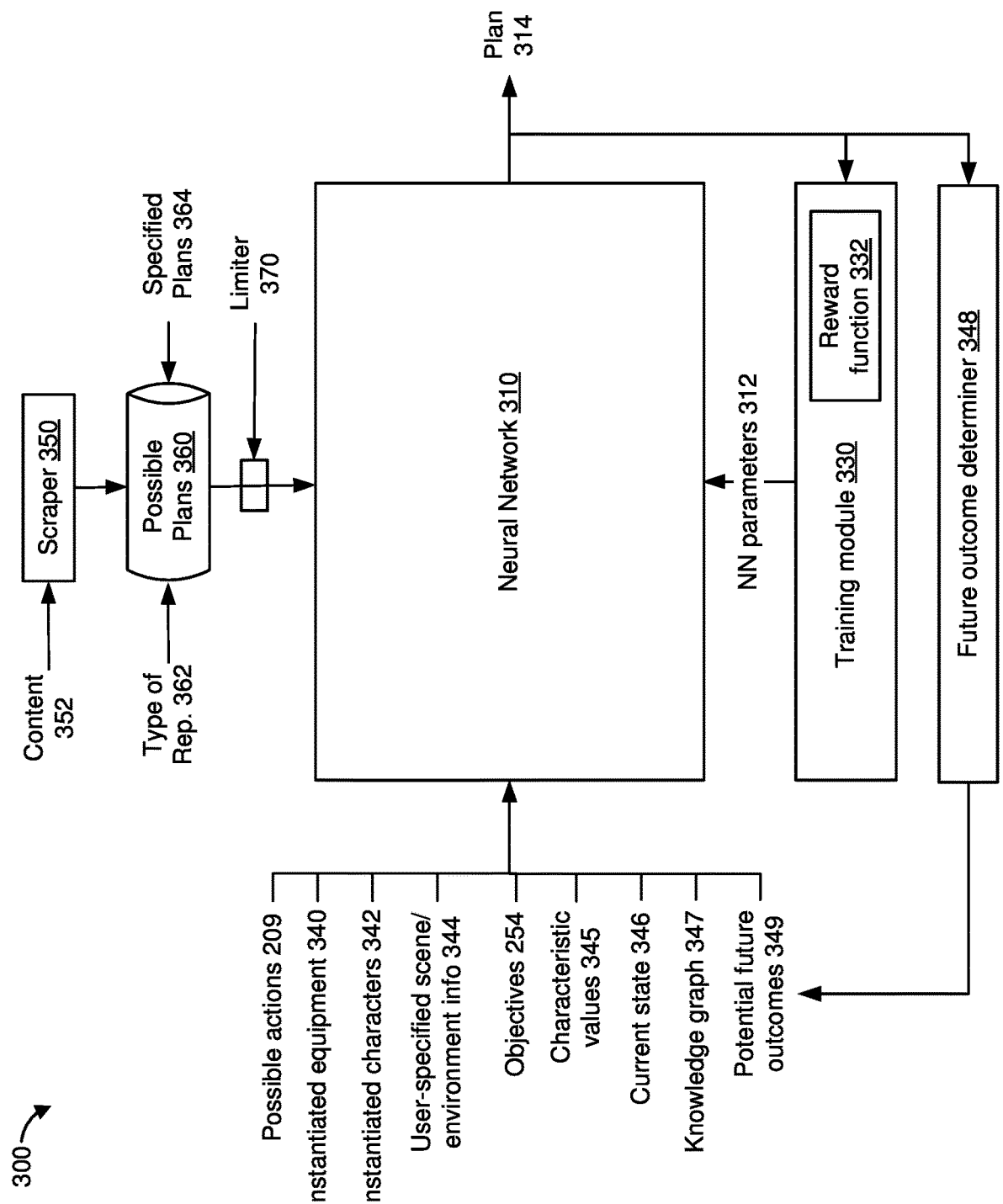
FIGS. 3A-3C are block diagrams of example planners in accordance with some implementations.

FIG. 3A is a block diagram of an example planner 300 in accordance with some implementations. In some implementations, the planner 300 generates a plan 314 for a corresponding objective-effectuator (e.g., a character objective-effectuator, an equipment objective-effectuator or an environmental objective-effectuator). In some implementations, the plan 314 triggers a CGR representation of the objective-effectuator (e.g., the boy action figure representation 108a, the girl action figure representation 108b, the robot representation 108c, and/or the drone representation 108d) to perform a series of actions in order to satisfy an objective.

In some implementations, different instances of the planner 300 implement the planners 204a . . . 204e. For example, a first instance of the planner 300 implements the planner 204a which generates the plan 206a for the boy action figure representation 108a. A second instance of the planner 300 implements the planner 204b which generates the plans 206b for the girl action figure representation 108b. A third instance of the planner 300 implements the planner 204c which generates the plan 206c for the robot representation 108c. A fourth instance of the planner 300 implements the planner 204d which generates the plan 206d for the drone representation 108d. A fifth instance of the planner 300 implements the planner 204e which generates the plan 206e for the environment of the CGR environment 106.

In various implementations, the planner 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible plans 360 to the neural network 310. In various implementations, the neural network 310 generates the plan 314 for a corresponding objective-effectuator based on various inputs.

In some implementations, the neural network 310 includes a long short-term memory (LSTM) recurrent neural network (RNN). In various implementations, the neural network 310 generates the plan 314 based on a function of the possible plans 360. For example, in some implementations, the neural network 310 generates the plan 314 by selecting one of the possible plans 360. In some implementations, the neural network 310 generates the plan 314 such that the plan 314 is within a degree of similarity to at least one of the possible plans 360.

In some implementations, the neural network 310 generates the plan 314 based on the set of possible actions 209. As described herein, in some implementations, the set of possible actions 209 include actions that a CGR representation of an objective-effectuator is capable of performing in a CGR environment. In some implementations, the neural network 310 generates the plan 314 such that the plan 314 can be satisfied (e.g., carried out) based on the set of possible actions 209.

In some implementations, the neural network 310 generates the plan 314 based on instantiated equipment representations 340. In some implementations, the instantiated equipment representations 340 refer to equipment objective-effectuators that are instantiated in the CGR environment. For example, referring to FIG. 1, the instantiated equipment representations 340 include the robot representation 108c and the drone representation 108d in the CGR environment 106. In some implementations, the plan 314 includes engaging with one or more of the instantiated equipment representations 340. For example, referring to FIG. 1, in some implementations, the plan 206b for the girl action figure representation 108b includes collaborating with the drone representation 108d to perform a search and rescue operation.

In some implementations, the neural network 310 generates the plan 314 based on instantiated character representations 342. In some implementations, the instantiated character representations 342 refer to character objective-effectuators that are instantiated in the CGR environment. For example, referring to FIG. 1, the instantiated character representations 342 include the boy action figure representation 108a and the girl action figure representation 108b in the CGR environment 106. In some implementations, the plan 314 includes engaging with one or more of the instantiated character representations 342. For example, referring to FIG. 1, in some implementations, the plan 206a for the boy action figure representation 108a includes catching the girl action figure representation 108b. In some implementations, the plan 206c for the robot representation 108c includes assisting the boy action figure representation 108a in catching the girl action figure representation 108b.

In some implementations, the neural network 310 generates the plan 314 based on user-specified scene/environment information 344. In some implementations, the user-specified scene/environment information 344 includes the initial/end states 212 and/or the environmental conditions 214 shown in FIG. 2. In some implementations, the plan 314 is a function of the initial/end states 212. In some implementations, the initial/end states 212 indicate initial/end placement for CGR representation of the objective-effectuator, and the plan 314 includes performing operations that trigger the CGR representation of the objective-effectuator to move away/towards from/to the initial/end placement. In some implementations, the neural network 310 adjusts the plan 314 so that the plan 314 is better suited for the user-specified scene/environment information 344. For example, the plan 314 includes a flying operation for the girl action figure representation 108b when the user-specified scene/environment information 344 indicate that the skies within the CGR environment 106 are clear. In some implementations, the neural network 310 forgoes the plan 314 if the plan 314 is unsuitable for the environment indicated by the user-specified scene/environment information 344. For example, if the plan 314 includes flying the drone representation 108d, then the neural network 300 forgoes the plan 314 when the user-specified scene/environment information 344 indicate high winds within the CGR environment 106.

In various implementations, the neural network 310 generates the plan 314 based on the objectives 254 from the emergent content engine 250. In some implementations, the neural network 310 generates the plan 314 in order to satisfy the objective 254 from the emergent content engine 250. In some implementations, the neural network 310 evaluates the possible plans 360 with respect to the objectives 254. In such implementations, the neural network 310 generates the plan 314 by selecting one of the possible plans 360 that satisfies the objectives 254 and forgoes selection of the possible plans 360 that do not satisfy the objectives 254.

In various implementations, the neural network 310 generates the plan 314 based on one or more characteristic values 345 associated with the objective-effectuator. In some implementations, the one or more characteristic values 345 indicate one or more physical characteristics (e.g., structural characteristics) of the CGR representation of the objective-effectuator. For example, the one or more characteristic values 345 indicate a body material of the CGR representation of the objective-effectuator. In such implementations, the plan 314 utilizes the physical characteristics that the CGR representation possesses, and does not utilize the physical characteristics that the CGR representation does not possess. For example, if the CGR representation is made from wax, then the plan 314 avoids going into an area of the CGR environment that is designated as a hot area where there is a risk of melting the wax.

In some implementations, the one or more characteristic values 345 indicate an accessory that the CGR representation of the objective-effectuator has (e.g., a jet pack for flying). In such implementations, the plan 314 utilizes the accessories that the CGR representation has, and avoids accessories that the CGR representation does not have. For example, if the CGR representation has the jet pack accessory, then the plan 314 may include flying. However, if the CGR representation does not have the jet pack accessory, then the plan 314 may not include flying or the plan 314 may include taking a CGR airplane to fly.

In some implementations, the one or more characteristic values indicate one or more behavioral characteristics of the CGR representation of the objective-effectuator. In some implementations, the behavioral characteristics include long-term personality traits such as a level of aggressiveness, a level of patience, a level of politeness, etc. In some implementations, the behavioral characteristics include short-term behavioral attributes such as a mood of the CGR representation of the objective-effectuator. In some implementations, the plan 314 includes actions that rely on behavioral traits which the CGR representation possesses. For example, if the CGR representation has a relatively high level of aggressiveness, then the plan 314 includes fighting. In some implementations, the plan 314 forgoes actions that rely on behavioral traits which the CGR representation does not possess. For example, if the CGR representation has a relatively low level of patience, then the plan 314 does not include waiting.

In some implementations, the neural network 310 obtains a current state 346 of the CGR representation of the objective-effectuator, and generates the plan 314 based on the current state 346 of the CGR representation of the objective-effectuator. In some implementations, the neural network 310 obtains the current state 346 from an emphatic engine that evaluates the current state 346 of the CGR representation of the objective-effectuator. In some implementations, the emphatic engine determines the current state 346 based on a body pose of the CGR representation. In some implementations, the emphatic engine determines the current state 346 based on a mood of the CGR representation of the objective-effectuator. In some implementations, the emphatic engine determines the current state 346 based on actions that the CGR representation is currently performing and/or has recently performed (e.g., within a threshold time prior to a current time). In some implementations, the emphatic engine determines the current state 346 based on an objective of the CGR representation of the objective-effectuator.

In some implementations, the neural network 310 obtains a portion of a knowledge graph 347 associated with the CGR environment. In some implementations, the knowledge graph 347 includes state information that represents one or more states (e.g., a current state and/or historical states) of the CGR environment. In some implementations, the portion of the knowledge graph 347 represents knowledge of the objective-effectuator. In some implementations, the neural network 310 generates the plan 314 based on the portion of the knowledge graph 347. As such, in some implementations, the plan 314 is generated based on the knowledge of the objective-effectuator.

In some implementations, a future outcome determiner 348 determines potential future outcomes 349 for the plan 314, and the neural network 310 adjusts the plan 314 based on the potential future outcomes 349. In some implementations, the future outcome determiner 348 determines the potential future outcomes 349 for various candidate plans (e.g., the candidate plans 314*a* . . . 314*n* shown in FIG. 3B), and the neural network 310 selects the plan 314 based on the potential future outcomes 349 for the candidate plans. In some implementations, the neural network 310 selects the candidate plan with the most favorable potential future outcome 349. In some implementations, the neural network 310 selects the candidate plan with the potential future outcome 349 in which the objective 254 for the objective-effectuator is satisfied. In some implementations, the future outcome determiner 348 determines the potential future outcomes 349 by simulating the plan 314 (e.g., by executing the plan 314 in a test CGR environment).

In various implementations, the training module 330 trains the neural network 310. In some implementations, the training module 330 provides neural network (NN) parameters 312 to the neural network 310. In some implementations, the neural network 310 includes a model of neurons, and the neural network parameters 312 represent weights for the neurons. In some implementations, the training module 330 generates (e.g., initializes/initiates) the neural network parameters 312, and refines the neural network parameters 312 based on the plan 314 generated by the neural network 310.

In some implementations, the training module 330 includes a reward function 332 that utilizes reinforcement learning to train the neural network 310. In some implementations, the reward function 332 assigns a positive reward to plans that are desirable, and a negative reward to plans that are undesirable. In some implementations, during a training phase, the training module 330 compares the plans with verification data that includes verified plans. In such implementations, if the plan 314 is within a degree of similarity to the verified plans, then the training module 330 stops training the neural network 310. However, if the plan 314 is not within the degree of similarity to the verified plans, then the training module 330 continues to train the neural network 310. In various implementations, the training module 330 updates the neural network parameters 312 during/after the training.

In various implementations, the scraper 350 scrapes content 352 to identify the possible plans 360. In some implementations, the content 352 includes movies, video games, comics, novels, and fan-created content such as blogs and commentary. In some implementations, the scraper 350 utilizes various methods, systems, and devices associated with content scraping to scrape the content 352. For example, in some implementations, the scraper 350 utilizes one or more text pattern matching, HTML (Hyper Text Markup Language) parsing, DOM (Document Object Model) parsing, image processing, and audio analysis in order to scrape the content 352 and identify the possible plans 360. In some implementations, the scraper 350 extracts actions from the content 352 and performs semantic analysis on the extracted actions to generate the possible plans 360.

In some implementations, an objective-effectuator is associated with a type of representation 362, and the neural network 310 generates the plan 314 based on the type of representation 362 associated with the objective-effectuator. In some implementations, the type of representation 362 indicates physical characteristics of the objective-effectuator, such as characteristics relating to its appearance and/or feel (e.g., color, material type, texture, etc.). In some implementations, the neural network 310 generates the plan 314 based on the physical characteristics of the objective-effectuator. In some implementations, the type of representation 362 indicates behavioral characteristics of the objective-effectuator (e.g., aggressiveness, friendliness, etc.). In some implementations, the neural network 310 generates the plan 314 based on the behavioral characteristics of the objective-effectuator. For example, the neural network 310 generates a fight plan for the boy action figure representation 108a in response to the behavioral characteristics including aggressiveness. In some implementations, the type of representation 362 indicates functional characteristics of the objective-effectuator (e.g., strength, speed, flexibility, etc.). In some implementations, the neural network 310 generates the plan 314 based on the functional characteristics of the objective-effectuator. For example, the neural network 310 generates a flight plan for the girl action figure representation 108b in response to the functional characteristics including flying. In some implementations, the type of representation 362 is determined based on a user input. In some implementations, the type of representation 362 is determined based on a combination of rules.

In some implementations, the neural network 310 generates the plan 314 based on specified plans 364. In some implementations, the specified plans 364 are provided by an entity that controls the fictional materials from where the character/equipment originated. For example, in some implementations, the specified plans 364 are provided (e.g., conceived of) by a movie producer, a video game creator, a novelist, etc. In some implementations, the possible plans 360 include the specified plans 364. As such, in some implementations, the neural network 310 generates the plan 314 by selecting a portion of the specified plans 364.

In some implementations, the possible plans 360 for an objective-effectuator are limited by a limiter 370. In some implementations, the limiter 370 restricts the neural network 310 from selecting a portion of the possible plans 360. In some implementations, the limiter 370 is controlled by the entity that controls (e.g., owns) the fictional materials from where the character/equipment originated. For example, in some implementations, the limiter 370 is controlled (e.g., operated and/or managed) by a movie producer, a video game creator, a novelist, etc. In some implementations, the limiter 370 and the neural network 310 are controlled/operated by different entities. In some implementations, the limiter 370 restricts the neural network 310 from generating plans that breach a criterion defined by the entity that controls the fictional materials.

Figure 3B:
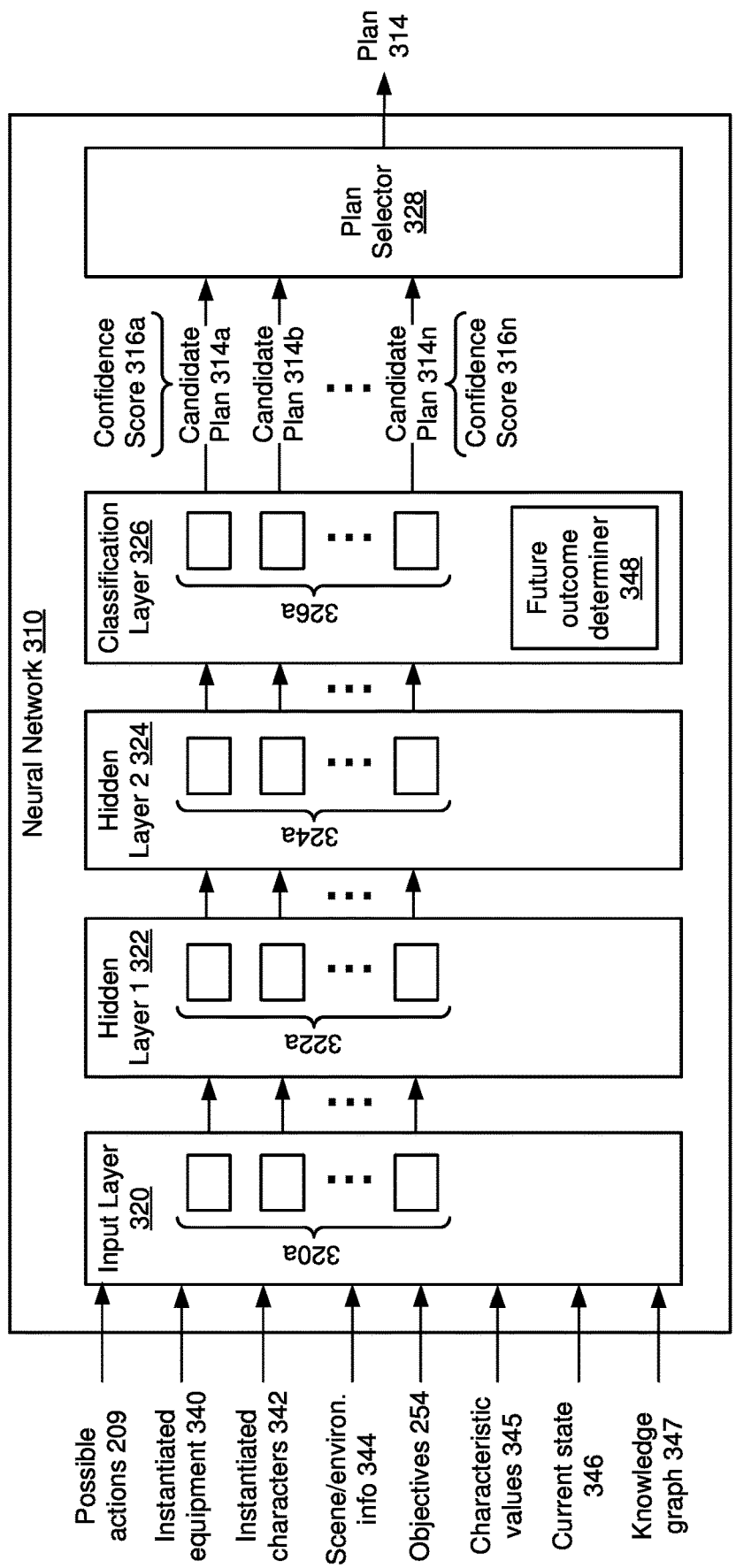

FIG. 3B is a block diagram of the neural network 310 in accordance with some implementations. In the example of FIG. 3B, the neural network 310 includes an input layer 320, a first hidden layer 322, a second hidden layer 324, a classification layer 326, and a plan selector 328. While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled (e.g., configured) to receive various inputs. In the example of FIG. 3B, the input layer 320 receives inputs indicating the set of possible actions 209, the instantiated equipment representations 340, the instantiated character representations 342, the user-specified scene/environment information 344, the objectives 254 from the emergent content engine 250, the one or more characteristic values 345, the current state 346, and the portion of the knowledge graph 347. In some implementations, the neural network 310 includes a feature extraction module (not shown) that generates a feature stream (e.g., a feature vector) based on the set of possible actions 209, the instantiated equipment representations 340, the instantiated character representations 342, the user-specified scene/environment information 344, the objectives 254, the one or more characteristic values 345, the current state 346 and/or the portion of the knowledge graph 347. In such implementations, the feature extraction module provides the feature stream to the input layer 320. As such, in some implementations, the input layer 320 receives a feature stream that is a function of the set of possible actions 209, the instantiated equipment representations 340, the instantiated character representations 342, the user-specified scene/environment information 344, the objectives 254, the one or more characteristic values 345, the current state 346 and/or the portion of the knowledge graph 347. In various implementations, the input layer 320 includes a number of LSTM logic units 320a, which are also referred to as model(s) of neurons by those of ordinary skill in the art. In some such implementations, an input matrix from the features to the LSTM logic units 320a includes rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3B, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of candidate plans 314a . . . 314n. In some implementations, the number of candidate plans 314a . . . 314n is approximately equal to the number of possible plans 360. In some implementations, the candidate plans 314a . . . 314n are associated with corresponding confidence scores 316a . . . 316n which include a probability or a confidence measure that the corresponding plan satisfies the objective 254. In some implementations, the outputs do not include plans that have been excluded by operation of the limiter 370.

In some implementations, the classification layer 326 includes the future outcome determiner 348. In such implementations, the future outcome determiner 348 determines potential future outcomes for each of the candidate plans 314a . . . 314n. In some implementations, the classification layer 326 determines the confidence scores 316a . . . 316n for the candidate plans 314a . . . 314n based on the respective potential future outcomes of the candidate plans 314a . . . 314n. In some implementations, the classification layer 326 assigns a higher confidence score to candidate plans that result in desirable potential future outcomes, and a lower confidence score to candidate plans that result in undesirable potential future outcomes. In some implementations, a desirable potential future outcome refers to an outcome in which the objective for the objective-effectuator is satisfied, whereas an undesirable potential future outcome refers to an outcome in which the objective for the objective-effectuator is not satisfied.

In some implementations, the plan selector 328 generates the plan 314 by selecting the top N candidate plans provided by the classification layer 326. For example, in some implementations, the plan selector 328 selects the candidate plan with the highest confidence score. In some implementations, the top N candidate plans are most likely to satisfy the objectives 254. In some implementations, the plan selector 328 provides the plan 314 to a rendering and display pipeline (e.g., the display engine 260 shown in FIG. 2).

Figure 3C:
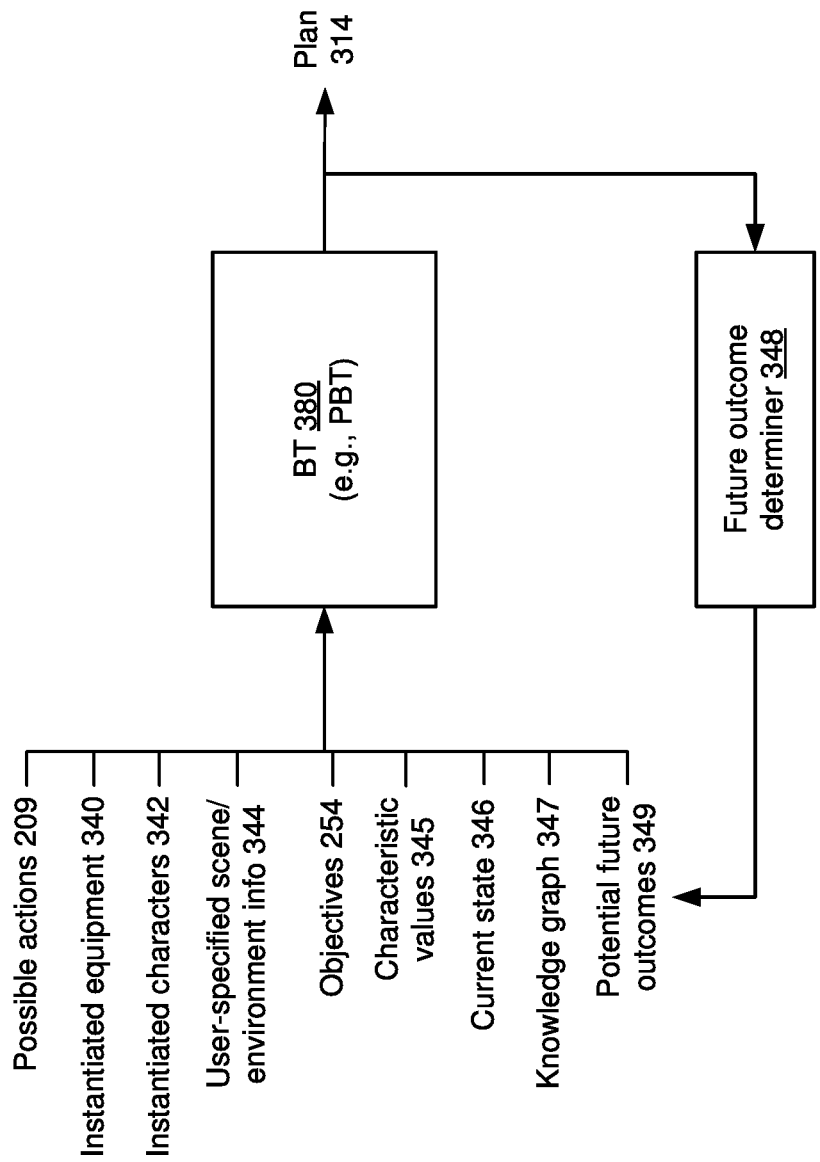

FIG. 3C illustrates a behavior tree (BT) 380. In some implementations, the BT 380 includes a probabilistic behavior tree (PBT). In the example of FIG. 3C, the BT 380 generates the plan 314 based on one or more inputs. As illustrated in FIG. 3C, in some implementations, the inputs to the BT 380 include indications of the set of possible actions 209, the instantiated equipment 340, the instantiated characters 342, the user-specified scene/environment information 344, the objectives 254, the characteristic value(s) 345, the current state 346 of the objective-effectuator, the portion of the knowledge graph 347, and/or the potential future outcomes 349. In some implementations, searching/traversing the BT 380 with one or more of the inputs shown in FIG. 3C results in the plan 314.

Figure 4A:
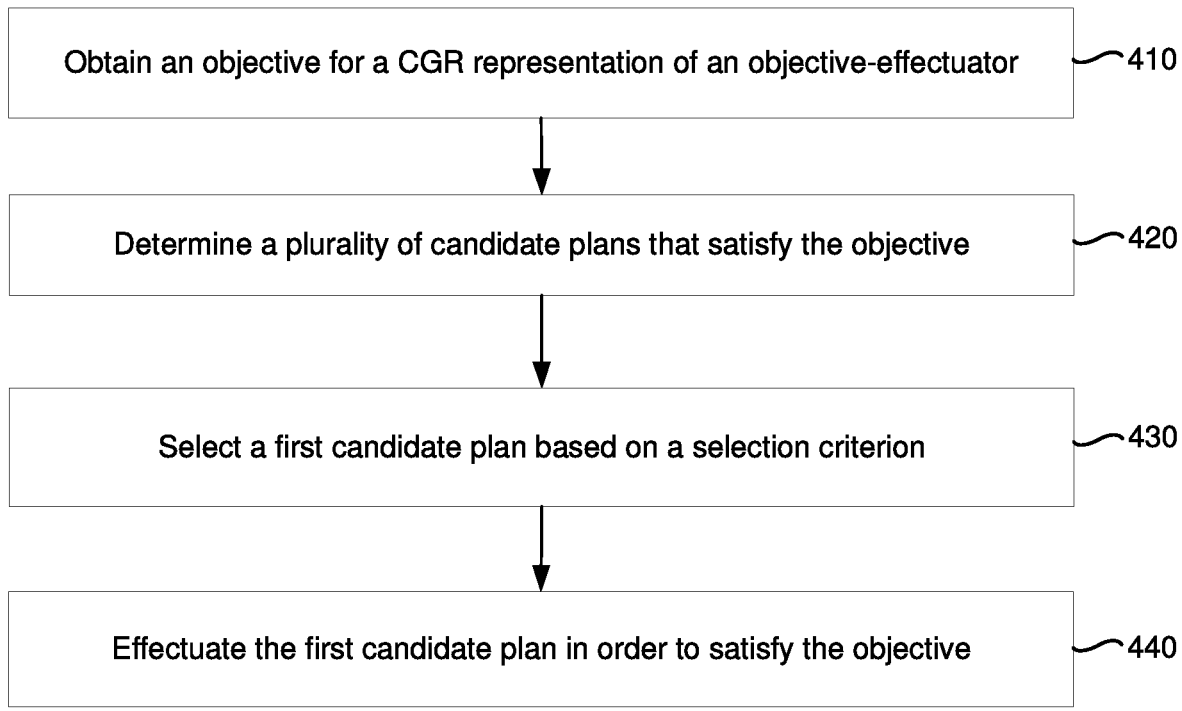
FIGS. 4A-4C are flowchart representations of a method of generating a plan for an objective-effectuator in accordance with some implementations.

FIG. 4A is a flowchart representation of a method 400 of generating a plan for an objective-effectuator. In various implementations, the method 400 is performed by a device with a non-transitory memory and one or more processors coupled with the non-transitory memory (e.g., the controller 102 and/or the electronic device 103 shown in FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 410, in various implementations, the method 400 includes obtaining an objective for a CGR representation of an objective-effectuator. In some implementations, the objective is associated with a plurality of time frames (e.g., several seconds, minutes, hours, days, weeks, months, years or decades). In some implementations, the method 400 includes receiving the objective from an emergent content engine that generated the objective. For example, as shown in FIG. 2, the planner 204a receives the objective 254 for the boy objective-effectuator, represented by the boy action figure representation 108a, from the emergent content engine 250. In some implementations, the method 400 includes generating the objective (e.g., by selecting the objective from a set of possible objectives). In some implementations, the method 400 includes retrieving the objective from a datastore.

As represented by block 420, in various implementations, the method 400 includes determining a plurality of candidate plans that satisfy the objective. In some implementations, each of the plurality of candidate plans is associated with a corresponding confidence score. For example, as shown in FIG. 3B, the neural network 310 determines the candidate plans 314a . . . 314n, and each of the candidate plans 314a . . . 314n is associated with corresponding confidence scores 316a . . . 316n.

As represented by block 430, in various implementations, the method 400 includes selecting a first candidate plan of the plurality of candidate plans based on a selection criterion (e.g., based on the respective confidence scores). For example, as shown in FIG. 3B, the plan selector 328 selects the plan 314 from the candidate plans 314a . . . 314n based on the confidence scores 316a . . . 316n. In some implementations, the method 400 includes selecting a candidate plan with a confidence score that satisfies a confidence threshold. For example, selecting a candidate plan with a confidence score that is greater than the confidence threshold. In some implementations, the method 400 includes selecting the candidate plan with the highest confidence score.

As represented by block 440, in various implementations, the method 400 includes effectuating the first candidate plan in order to satisfy the objective. In some implementations, the first candidate plan triggers the CGR representation of the objective-effectuator to perform a series of actions over the plurality of time frames associated with the objective. In some implementations, the method 400 includes generation actions in accordance with the plan, and performing the generated actions. For example, as shown in FIG. 2, the planners 204a . . . 204n provide the plans 206a . . . 206n to the objective-effectuator engines in order to allow the objective-effectuator engines to generate the actions 210a . . . 210n in accordance with the plans 206a . . . 206n.

Figure 4B:
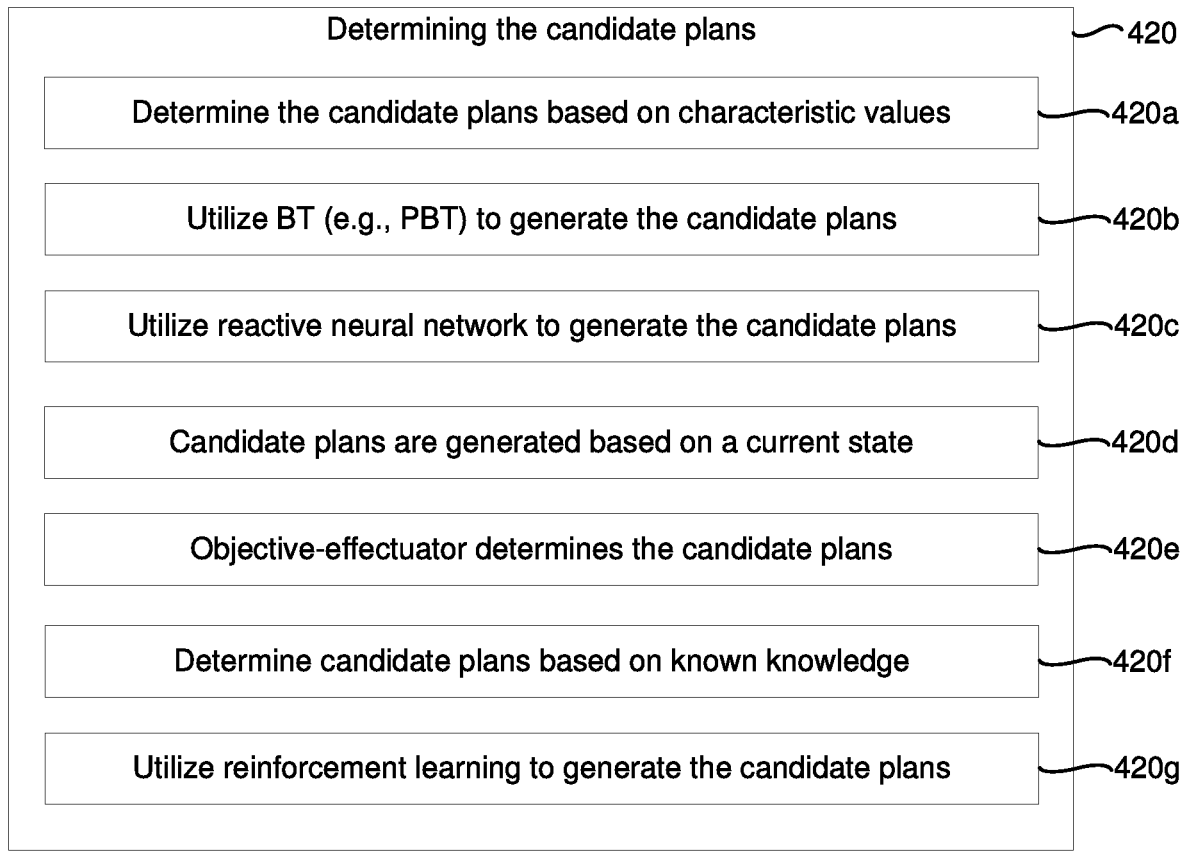

Referring to FIG. 4B, as represented by block 420a, in some implementations, the method 400 includes determining the plurality of candidate plans based on one or more characteristic values associated with the objective-effectuator (e.g., the one or more characteristic values 345 shown in FIGS. 3A-3C). In some implementations, the characteristic values indicate various characteristics of the CGR representation of the objective-effectuator. In such implementations, the method 400 includes determining the plurality of candidate plans based on the characteristics of the CGR representation of the objective-effectuator. For example, the method 400 includes assigning higher confidence scores to candidate plans that the characteristics support and assigning lower confidence scores to candidate plans that the characteristics do not support. In some implementations, the one or more characteristic values indicate one or more physical/ structural characteristics of the CGR representation of the objective-effectuator (e.g., body material, accessories such as a jet pack, etc.). In some implementations, the one or more characteristic values indicate one or more behavioral characteristics of the CGR representation of the objective-effectuator (e.g., level of aggressiveness, mood, etc.). In some implementations, the one or more characteristic values indicate one or more functional characteristics of the CGR representation of the objective-effectuator (e.g., running, flying, defying gravity, etc.).

As represented by block 420*b*, in some implementations, the method 400 includes utilizing a behavior tree (BT) (e.g., a probabilistic behavior tree (PBT) to generate the plurality of candidate plans (e.g., the BT 380 shown in FIG. 3C). In some implementations, the method 400 includes searching the BT for the plurality of candidate plans based on one or more characteristic values associated with the objective-effectuator. In some implementations, the method 400 includes traversing the BT for the plurality of candidate plans based on one or more characteristic values associated with the objective-effectuator. For example, in some implementations, the BT generates the candidate plans 314*a* . . . 314*n* shown in FIG. 3B.

As represented by block 420*c*, in some implementations, the method 400 includes utilizing a reactive neural network to generate the plurality of candidate plans. For example, in some implementations, the reactive neural network generates the candidate plans 314*a* . . . 314*n* shown in FIG. 3B.

As represented by block 420*d*, in some implementations, the method 400 includes generating the candidate plans based on a current state of the CGR representation of the objective-effectuator (e.g., based on the current state 346 shown in FIGS. 3A-3C). In some implementations, the method 400 includes obtaining a current state of the CGR representation of the objective-effectuator, and determining the plurality of candidate plans based on the current state of the CGR representation of the objective-effectuator. In some implementations, the method 400 includes utilizing an emphatic engine to evaluate the current state of the CGR representation of the objective-effectuator. In some implementations, the method 400 includes evaluating the current state of the CGR representation of the objective-effectuator based on a body pose of the CGR representation and/or based on actions being performed by the CGR representation. In some implementations, the method 400 includes providing the current state of the CGR representation of the objective-effectuator as an input to a neural network that generates the plurality of candidate plans (e.g., providing the current state as an input to the neural network 310 shown in FIG. 3A).

As represented by block 420*e*, in some implementations, the objective-effectuator determines the plurality of candidate plans. In some implementations, the objective-effectuator includes a planner (e.g., the planner 300 shown in FIG. 3A) that determines the plurality of candidate plans. In some implementations, the planner is integrated into an objective-effectuator engine that generates actions for the CGR representation of the objective-effectuator (e.g., in some implementations, the planner 204*a* is integrated into the character engine 208*a* shown in FIG. 2).

As represented by block 420*f*, in some implementations, the method 400 includes determining the candidate plans based on known knowledge (e.g., based on the portion of the knowledge graph 347 shown in FIGS. 3A-3C). In some implementations, each objective-effectuator has access to a limited portion of a knowledge graph, and all objective-effectuators collectively have access to the entire knowledge graph. In such implementations, the method 400 includes determining the plurality of candidate plans based on the portion of the knowledge graph for which the objective-effectuator has access.

As represented by block 420*g*, in some implementations, the method 400 includes generating the plurality of candidate plans based on reinforcement learning. For example, in some implementations, the method 400 includes assigning higher scores to desirable plans during a training phase, and assigning lower scores to undesirable plans during the training phase. In some implementations, the method 400 includes generating the plurality of candidate plans based on initiation learning.

Figure 4C:
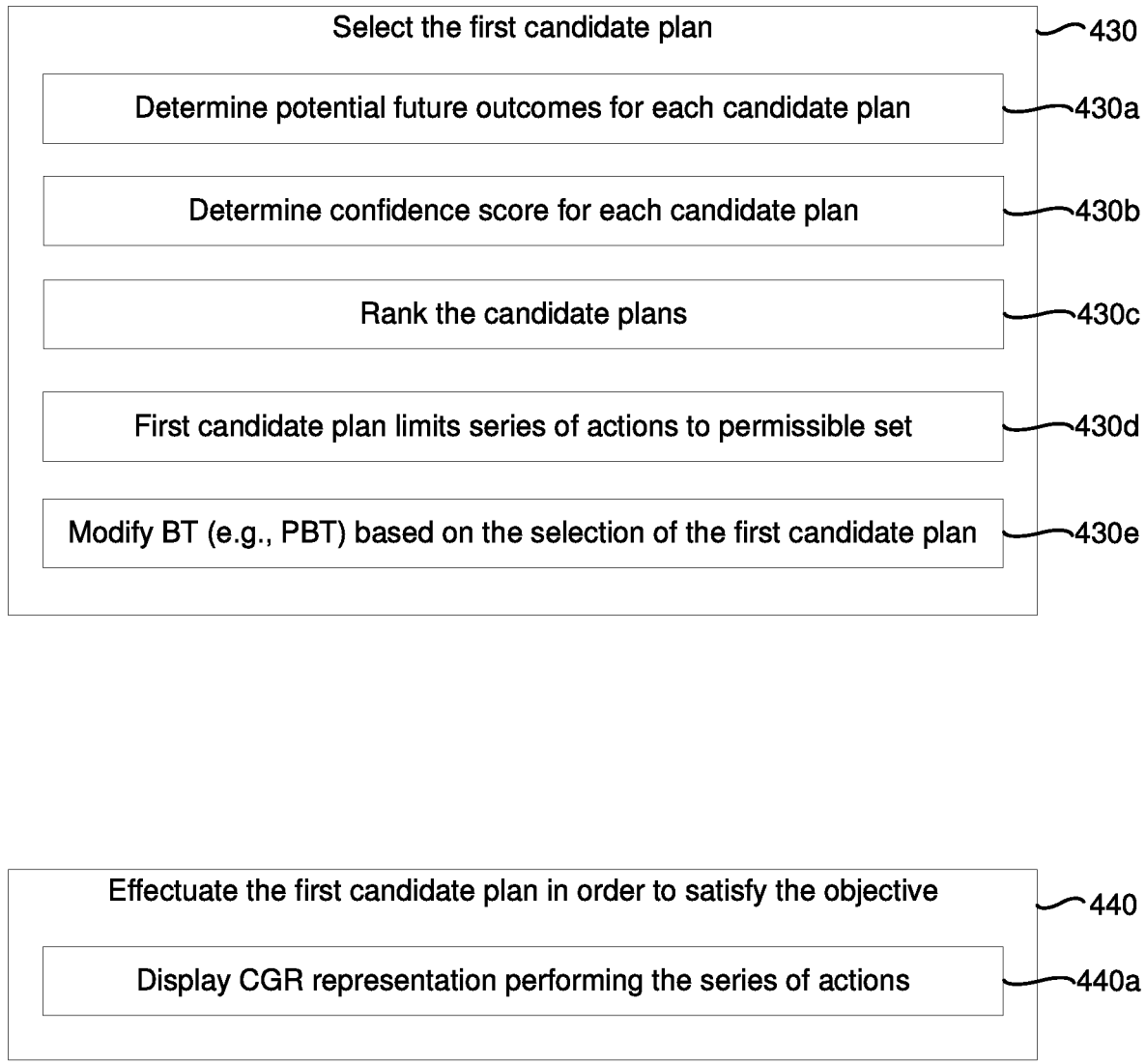

Referring to FIG. 4C, as represented by block 430*a*, in some implementations, the method 400 includes determining respective potential future outcomes for each of the plurality of candidate plans (e.g., the potential future outcomes 349 shown in FIGS. 3A-3C). For example, determining respective potential future outcomes for each of the candidate plans 314*a* . . . 314*n* shown in FIG. 3B.

As represented by block 430*b*, in some implementations, the method 400 includes determining corresponding confidence scores for the plurality of candidate plans based on the potential future outcomes. For example, determining the confidence scores 316*a* . . . 316*n* for the candidate plans 314*a* . . . 314*n* shown in FIG. 3B. In some implementations, the method 400 includes assigning higher confidence scores to candidate plans that result in desirable potential future outcomes, and assigning lower confidence scores to candidate plans that result in undesirable potential future outcomes.

As represented by block 430*c*, in some implementations, the method 400 includes ranking the plurality of candidate plans based on the respective potential future outcomes. For example, the method 400 includes assigning higher ranks to candidate plans that result in desirable potential future outcomes, and assigning lower ranks to candidate plans that result in undesirable potential future outcomes. In some implementations, the method 400 includes ranking the plurality of candidate plans based on the corresponding confidence scores.

As represented by block 430*d*, in some implementations, the first candidate plan limits the series of actions to a permissible set of actions. In some implementations, the first candidate plan limits the series of actions in order to avoid an impermissible set of actions. In some implementations, the first candidate plan guides the objective-effectuator engine in generating the actions. For example, the first candidate plan indicates types of actions for the objective-effectuator engine to generate. In some implementations, the first candidate plan indicates a sequence for different types of actions for the objective-effectuator.

As represented by block 430*e*, in some implementations, the method 400 includes modifying the BT (e.g., the PBT) based on the selection of the first candidate plan (e.g., modifying the BT 380 based on the selection of the plan 314). In some implementations, the method 400 includes, after selecting the first candidate plan, assigning more weight (e.g., a higher probability) to a portion of the BT that corresponds to the first candidate plan. In some implementations, the method 400 includes, after selecting the first candidate plan, assigning less weight (e.g., a lower probability) to a portion of the BT that does not correspond to the first candidate plan.

As represented by block 440a, in some implementations, the method 400 includes displaying the CGR representation of the objective-effectuator performing the series of actions over the plurality of time frames in accordance with the first candidate plan. For example, displaying the boy action figure representation 108a performing the actions 210a that were generated in accordance with the plan 206a shown in FIG. 2. In some implementations, the method 400 includes animating (e.g., manipulating) the CGR representation of the objective-effectuator in order to provide an appearance that the CGR representation of the objective-effectuator is performing the series of actions.

Figure 5:
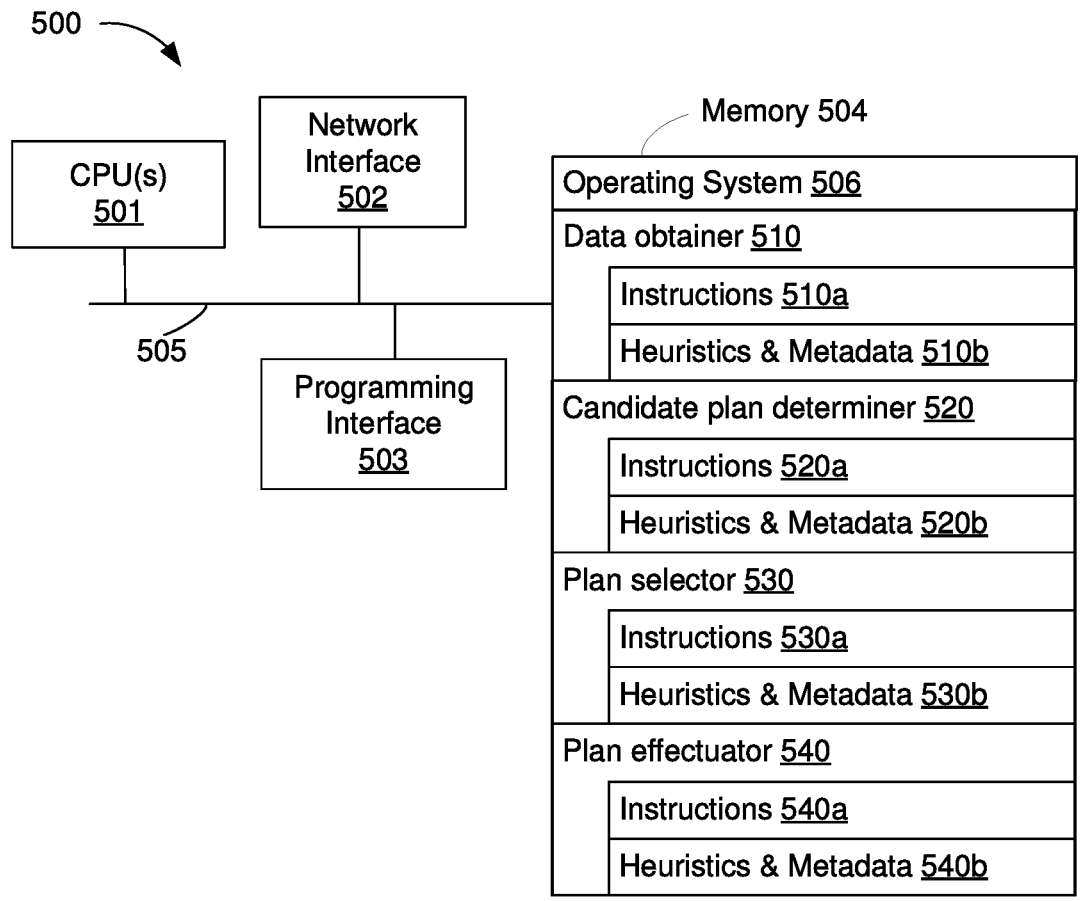
FIG. 5 is a block diagram of a device enabled with various components of the planner in accordance with some implementations.

FIG. 5 is a block diagram of a device 500 enabled with one or more components of a planner (e.g., one of the planners 204a . . . 204e shown in FIG. 2, or the planner 300 shown in FIG. 3A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, a data obtainer 510, a candidate plan determiner 520, a plan selector 530, and a plan effectuator 540. In various implementations, the device 500 performs the method 400 shown in FIGS. 4A-4C.

In some implementations, the data obtainer 510 obtains an objective for a CGR representation of an objective-effectuator. In some implementations, the data obtainer 510 performs the operation(s) represented by block 410 in FIG. 4A. To that end, the data obtainer 510 includes instructions 510a, and heuristics and metadata 510b.

In some implementations, the candidate plan determiner 520 determines a plurality of candidate plans that satisfy the objective. In some implementations, the candidate plan determiner 520 performs the operations(s) represented by blocks 420 and 420a . . . 420g shown in FIGS. 4A-4B. To that end, the candidate plan determiner 520 includes instructions 520a, and heuristics and metadata 520b.

In some implementations, the plan selector 530 selects a first candidate plan of the plurality of candidate plans based on the respective confidence scores. In some implementations, the plan selector 530 performs the operations represented by blocks 430 and 430a . . . 430e shown in FIGS. 4A and 4C. To that end, the plan selector 530 includes instructions 530a, and heuristics and metadata 530b.

In some implementations, the plan effectuator 540 effectuates the first candidate plan in order to satisfy the objective. In some implementations, the plan effectuator 540 performs the operations represented by blocks 440 and 440a shown in FIGS. 4A and 4C. To that end, the plan effectuator 540 includes instructions 540a, and heuristics and metadata 540b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
obtaining an objective for a computer-generated reality (CGR) representation of an objective-effectuator operating in a CGR environment that is associated with a knowledge graph, wherein the objective is associated with a plurality of time frames;
determining, based on a portion of the knowledge graph that is accessible to the objective-effectuator, a plurality of candidate plans that satisfy the objective;
selecting a first candidate plan of the plurality of candidate plans based on a selection criterion; and
effectuating the first candidate plan in order to satisfy the objective, wherein the first candidate plan triggers the CGR representation of the objective-effectuator to perform a series of actions over the plurality of time frames associated with the objective.

2. The method of claim 1, wherein determining the plurality of candidate plans comprises:
determining the plurality of candidate plans based on one or more characteristic values associated with the objective-effectuator.

3. The method of claim 2, wherein the one or more characteristic values indicate one or more physical characteristics of the CGR representation of the objective-effectuator.

4. The method of claim 2, wherein the one or more characteristic values indicate one or more behavioral characteristics of the objective-effectuator.

5. The method of claim 1, wherein determining the plurality of candidate plans comprises:
utilizing a behavior tree (BT) to generate the plurality of candidate plans.

6. The method of claim 5, wherein utilizing the BT comprises:
searching the BT for the plurality of candidate plans based on one or more characteristic values associated with the objective-effectuator.

7. The method of claim 5, wherein utilizing the BT comprises:
traversing the BT for the plurality of candidate plans based on one or more characteristic values associated with the objective-effectuator.

8. The method of claim 5, further comprising:
modifying the BT based on the selection of the first candidate plan.

9. The method of claim 1, wherein determining the plurality of candidate plans comprises:
utilizing a neural network to generate the plurality of candidate plans.

10. The method of claim 1, wherein determining the plurality of candidate plans comprises:
obtaining a current state of the CGR representation of the objective-effectuator; and
determining the plurality of candidate plans based on the current state of the CGR representation of the objective-effectuator.

11. The method of claim 10, wherein obtaining the current state of the CGR representation of the objective-effectuator comprises:
utilizing an emphatic engine to evaluate the current state of the CGR representation of the objective-effectuator.

12. The method of claim 10, wherein determining the plurality of candidate plans comprises:
providing the current state of the CGR representation of the objective-effectuator as an input to a neural network that generates the plurality of candidate plans.

13. The method of claim 1, wherein the objective-effectuator determines the plurality of candidate plans.

14. The method of claim 1, wherein determining the plurality of candidate plans comprises:
generating the plurality of candidate plans based on reinforcement learning.

15. The method of claim 1, wherein effectuating the first candidate plan comprises:
displaying a manipulation of the CGR representation of the objective-effectuator in order to provide an appearance that the CGR representation of the objective-effectuator is performing the series of actions over the plurality of time frames in accordance with the first candidate plan.

16. The method of claim 1, wherein each of the plurality of candidate plans is associated with a corresponding confidence score, and wherein selecting the first candidate plan based on the selection criterion comprises:
selecting the first candidate plan based on the respective confidence scores of the plurality of candidate plans.

17. The method of claim 1, wherein the first candidate plan limits the series of actions to a permissible set of actions.

18. A device comprising:
one or more processors;
a non-transitory memory;
one or more displays; and
one or more programs stored in the non-transitory memory, which, when executed by the one or more processors, cause the device to:
obtain an objective for a computer-generated reality (CGR) representation of an objective-effectuator operating in a CGR environment that is associated with a knowledge graph, wherein the objective is associated with a plurality of time frames;
determine, based on a portion of the knowledge graph that is accessible to the objective-effectuator, a plurality of candidate plans that satisfy the objective;
select a first candidate plan of the plurality of candidate plans based on a selection criterion; and
effectuate the first candidate plan in order to satisfy the objective, wherein the first candidate plan triggers the CGR representation of the objective-effectuator to perform a series of actions over the plurality of time frames associated with the objective.

19. The device of claim 18, wherein determining the plurality of candidate plans comprises:
determining the plurality of candidate plans based on one or more characteristic values associated with the objective-effectuator.

20. The device of claim 19, wherein the one or more characteristic values indicate one or more physical characteristics of the CGR representation of the objective-effectuator.

21. The device of claim 19, wherein the one or more characteristic values indicate one or more behavioral characteristics of the objective-effectuator.

22. A non-transitory memory storing one or more programs, which, when executed by one or more processors of a device with a display, cause the device to:
- obtain an objective for a computer-generated reality (CGR) representation of an objective-effectuator operating in a CGR environment that is associated with a knowledge graph, wherein the objective is associated with a plurality of time frames;
- determine, based on a portion of the knowledge graph that is accessible to the objective-effectuator, a plurality of candidate plans that satisfy the objective;
- select a first candidate plan of the plurality of candidate plans based on a selection criterion; and
- effectuate the first candidate plan in order to satisfy the objective, wherein the first candidate plan triggers the CGR representation of the objective-effectuator to perform a series of actions over the plurality of time frames associated with the objective.

23. The non-transitory memory of claim 22, wherein determining the plurality of candidate plans comprises:
- utilizing a behavior tree (BT) to generate the plurality of candidate plans.

24. The non-transitory memory of claim 23, wherein utilizing the BT comprises:
- searching the BT for the plurality of candidate plans based on one or more characteristic values associated with the objective-effectuator.

25. The non-transitory memory of claim 23, wherein utilizing the BT comprises:
- traversing the BT for the plurality of candidate plans based on one or more characteristic values associated with the objective-effectuator.

* * * * *